No. 706,975. Patented Aug. 12, 1902.
F. D. MACBETH.
DEVICE FOR PROTECTING THE EAR DRUM.
(Application filed June 6, 1901.)
(No Model.)

Witnesses.
H. J. Meyer, Jr.
F. S. Stitt.

Inventor.
Frank D. Macbeth
By Chas. B. Mann
Attorney.

UNITED STATES PATENT OFFICE.

FRANK D. MACBETH, OF BALTIMORE, MARYLAND, ASSIGNOR OF ONE-HALF TO WILLIAM A. BULLOCK, OF BALTIMORE, MARYLAND.

DEVICE FOR PROTECTING THE EAR-DRUM.

SPECIFICATION forming part of Letters Patent No. 706,975, dated August 12, 1902.

Application filed June 6, 1901. Serial No. 63,350. (No model.)

*To all whom it may concern:*

Be it known that I, FRANK D. MACBETH, a citizen of the United States, residing at Baltimore, in the State of Maryland, have invented certain new and useful Improvements in Devices for Protecting the Ear-Drum, of which the following is a specification.

The object of this invention is to provide an appliance, permanent or stable in character, adapted for repeated insertions in the auditory canal whenever necessary for the purpose of excluding sound, air, and water from the said canal.

The invention consists in certain constructions and arrangements of the parts hereinafter described and claimed, reference being had to the accompanying drawings, in which—

Figure 1:
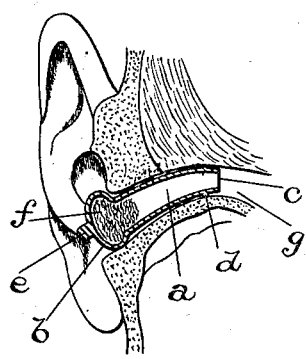
Figure 2:
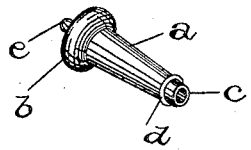

Figure 1 is a view illustrating a portion of a human ear with the improved appliance inserted in the auditory canal. Fig. 2 is a perspective view of the appliance.

The casing of the improved appliance is made of rubber or some other similar permanent substance unaffected or infusible by the heat of the body, as it is intended for repeated insertions in and removals from the auditory canal as the occasion may arise. Said casing comprises a longitudinally-extended tubular body portion $a$ and a hollow bulged or bulb-like head $b$, which forms at the point of juncture with the said tubular portion an abrupt shoulder. The said body portion is of conical form and is open at its smaller end $c$ and is provided near said open end with an exterior bead $d$. The head end of the casing is closed and is provided with a knob $e$. The hollow head $b$ and adjacent portion of the body $a$ are filled, as shown in Fig. 1, with raw cotton, silk, or other fibrous material $f$, impregnated with paraffin, and the interior and exterior surfaces of the rubber casing are also coated with paraffin. In practice the tubular portion is inserted with its smaller and open end first into the auditory canal $g$ of the ear, as shown in Fig. 1, and is pushed into the said canal until the bulged or bulb-like head $b$, which is much larger than the open tube, abuts against the walls of the concha. The bulb-like head forms an abrupt shoulder or stop which prevents the appliance from being pushed too far into the auditory canal and determines the proper position of the appliance without any especial effort at adjustment on the part of the person using it. The sound-waves gathered by the auricle instead of going through the concha into the auditory canal and beating against the ear-drum fall upon the bulged hollow head $b$ and are thus broken up and reflected, and in cases where the concussion is so great as to cause very violent vibrations of the atmosphere the sound-excluding appliance will prevent any suction of air from or inrush of air into the auditory canal. The paraffin coating of the casing will soften under the action of the body heat and make the contact of the appliance with the membrane of the auditory canal so complete that sound cannot find access to the ear-drum, although the casing itself, as is manifest from the nature of the material of which it is composed, will not be melted by the heat of the body. By impregnating the fibrous material $f$ with paraffin the interstices are all filled and a practically perfect obstacle to the sound-waves is formed, and by leaving the smaller or inner end of the appliance open the air in the auditory canal will find place in the tubular body $a$ and will not be compressed enough to cause discomfort. The bead $d$ at the smaller end of the tubular body portion $a$ will contact with the walls of the auditory canal and serve to hold the appliance in place, and the protuberance $e$ at the other end of the appliance serves as a finger-hold, by which the appliance may be inserted in or withdrawn from the ear.

The appliance hereinbefore described is especially useful for protecting the ear-drums of artillerists or the like, for sick persons who must be kept perfectly quiet and free from noise, for workmen in boiler-shops or similar noisy places, and for preventing water from entering the ears of bathers.

It is to be understood that changes may be made in the form, construction, and arrangement of the appliance herein shown and described without departing from the scope of the invention as defined in the appended claims.

Having thus described my invention, what I claim as new, and desire to secure by Letters Patent, is—

1. An appliance permanent in character for excluding sound, air, and water from the auditory canal, comprising a hollow casing infusible by the heat of the body and having a longitudinally-extended tubular open-end portion, *a*, adapted to be inserted in the auditory canal, and a closed bulb-like hollow head, *b*, larger than the open-end tube and forming at the point of juncture between said tube and said head an abrupt shoulder adapted to abut against the walls of the concha and thereby prevent the appliance from being pushed inwardly too far.

2. An appliance permanent in character for excluding sound, air, and water from the auditory canal, comprising a hollow rubber casing adapted to be inserted in the auditory canal and coated with paraffin; and a filling in said casing.

3. An appliance permanent in character for excluding sound, air, and water from the auditory canal, comprising a casing provided with a tubular body portion open at one end and having an exterior bead near its open end and said casing also provided at the other end of said body portion with a hollow bulged head having a protuberance, *e*; and fibrous material in said casing.

In testimony whereof I affix my signature in the presence of two witnesses.

FRANK D. MACBETH.

Witnesses:
WM. A. BULLOCK,
CHARLES L. VIETSCH.